US008109555B2

(12) United States Patent
DeVoss et al.

(10) Patent No.: US 8,109,555 B2
(45) Date of Patent: Feb. 7, 2012

(54) POWER FOLDING SEAT MECHANISM (75) Inventors: Catherine A. DeVoss, Plymouth, MI (US); Lei Cao, Farmington Hills, MI (US); Matthew J. McLaughlin, Chesterfield Township, MI (US); Jeffrey P. Carroll, West Bloomfield, MI (US)

(73) Assignee: Intier Automotive Inc, Newmarket (CA)

( * ) Notice: Subject to any disclaimer, the term of this patent is extended or adjusted under 35 U.S.C. 154(b) by 381 days.

(21) Appl. No.: 12/360,396

(22) Filed: Jan. 27, 2009

(65) Prior Publication Data
US 2009/0189408 A1 Jul. 30, 2009

Related U.S. Application Data (60) Provisional application No. 61/024,588, filed on Jan. 30, 2008.

(51) Int. Cl.
*B60N 2/02* (2006.01)
(52) U.S. Cl. ............. 296/65.08; 296/65.09; 297/378.12
(58) Field of Classification Search ............... 296/65.08, 296/65.09, 37.14, 65.01, 65.18, 69; 297/330, 297/331, 344.17, 15, 378.12
See application file for complete search history.

(56) References Cited

U.S. PATENT DOCUMENTS

| 5,269,581 | A | 12/1993 | Odagaki et al. |
|---|---|---|---|
| 6,837,530 | B2 | 1/2005 | Rudberg et al. |
| 7,063,368 | B2 | 6/2006 | Kayumi |
| 7,090,277 | B2 * | 8/2006 | Andrigo et al. ............ 296/65.08 |
| 7,108,306 | B2 | 9/2006 | Suda et al. |
| 7,152,900 | B2 | 12/2006 | Trombley et al. |
| 7,377,582 | B2 | 5/2008 | Fukada et al. |
| 2007/0052256 | A1 | 3/2007 | Trombley et al. |

FOREIGN PATENT DOCUMENTS
WO 2006012738 A1 2/2006
* cited by examiner

*Primary Examiner* — Glenn Dayoan
*Assistant Examiner* — Melissa A Black
(74) *Attorney, Agent, or Firm* — Miller Canfield (57) ABSTRACT

A power riser assembly riser assembly includes a rear leg pivotally coupled between a seat assembly and a vehicle floor defining upper and lower axes. A drive linkage is operatively coupled between the seat assembly and floor. A drive mechanism coupled to the drive linkage actuates in a first direction causing the drive linkage to pivot the seat assembly about the lower axis from a seating position to an intermediate position whereat the drive linkage transfers pivotal movement of the seat assembly to the upper axis, thereby moving the seat assembly to the stowed position. The drive mechanism actuates in a second direction causing the drive linkage to pivot the seat assembly about the upper axis from the stowed position to the intermediate position whereat the drive linkage transfers pivotal movement of the seat assembly to the lower axis, thereby moving the seat assembly to the seating position.

17 Claims, 8 Drawing Sheets

POWER FOLDING SEAT MECHANISM

This application claims priority to and all the benefits of U.S. Provisional Application No. 61/024,588, filed on Jan. 30, 2008 and entitled "Power Folding Seat Mechanism."

BACKGROUND OF THE INVENTION

1. Field of the Invention

The invention relates to a seat assembly for an automotive vehicle. More particularly, the invention relates to a power riser assembly for moving a seat assembly between a seating position spaced above a floor in a automotive vehicle and a stowed position disposed within a recess formed in the floor.

2. Description of Related Art

Automotive vehicles include seat assemblies for supporting occupants above a floor within a vehicle interior. A typical seat assembly includes a seat cushion and a seat back pivotally coupled to the seat cushion by a recliner mechanism for movement of the seat back between a plurality of reclined seating positions. It is common that the seat back is also movable between any one of the reclined seating positions and a generally horizontal, forwardly folded position overlying the seat cushion.

It is known in the automotive vehicle seating art to provide a seat assembly that is moveable between a seating position with the seat cushion spaced above the floor and a stowed position with the seat cushion and seat back disposed within a recess formed in the floor. Examples of such seat assemblies are disclosed in U.S. Pat. Nos. 5,269,581 and 6,837,530; and U.S. Patent Application No. 60/598,410. Generally, in such seat assemblies, a riser assembly or leg extends between an upper end pivotally coupled to the seat cushion and a lower end pivotally coupled to the floor. An actuator selectively pivots the seat cushion about the upper end of the leg while the lower end of the leg pivots about the floor to move the seat assembly between the seating and stowed positions.

It is desirable to provide a power riser assembly for a seat assembly which employs a drive linkage for transferring movement from a lower pivot to an upper pivot in order to move the seat assembly from a seating position to a stowed position.

SUMMARY OF THE INVENTION

According to one aspect of the invention, there is provided a power riser assembly operatively coupled between a seat assembly and a floor of an automotive vehicle for moving the seat assembly between a seating position spaced above the floor and a stowed position disposed within a recessed cavity in the floor. The power riser assembly includes an anchor adapted to be fixedly secured to the floor. The anchor defines opposite seating and stowed end stops. A rear leg extends between an upper end pivotally coupled to the seat assembly defining an upper axis and a lower end pivotally coupled to the anchor defining a lower axis. The lower end of the rear leg includes a stop pin projecting laterally therefrom for engaging the seating and stowed end stops of the anchor. The upper end of the rear leg includes a shark fin for engaging the seat assembly as the stop pin travels between the seating and stowed end stops. A drive mechanism is mounted to the seat assembly. A drive linkage is operatively coupled between the drive mechanism and the anchor. The drive linkage is operable for pivoting the seat assembly about the lower axis and the upper axis and transfers pivotal movement of the seat assembly between the lower and upper axes. The drive linkage pivots the seat assembly about the lower axis toward the stowed position in response to operation of the drive mechanism in a first direction such that the stop pin on the rear leg travels from the seating end stop to the stowed end stop. The drive linkage transfers pivotal movement of the seat assembly to the upper axis in response to continued operation of the drive mechanism in the first direction when the stop pin engages the stowed end stop thereby moving the seat assembly to the stowed position. The drive linkage pivots the seat assembly about the upper axis toward the seating position in response to operation of the drive mechanism in a second direction. The drive linkage transfers pivotal movement of the seat assembly to the lower axis in response to continued operation of the drive mechanism in the second direction when the shark fin on the rear leg engages the seat assembly such that the stop pin on the rear leg travels from the stowed end stop to the seating end stop thereby moving the seat assembly to the seating position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
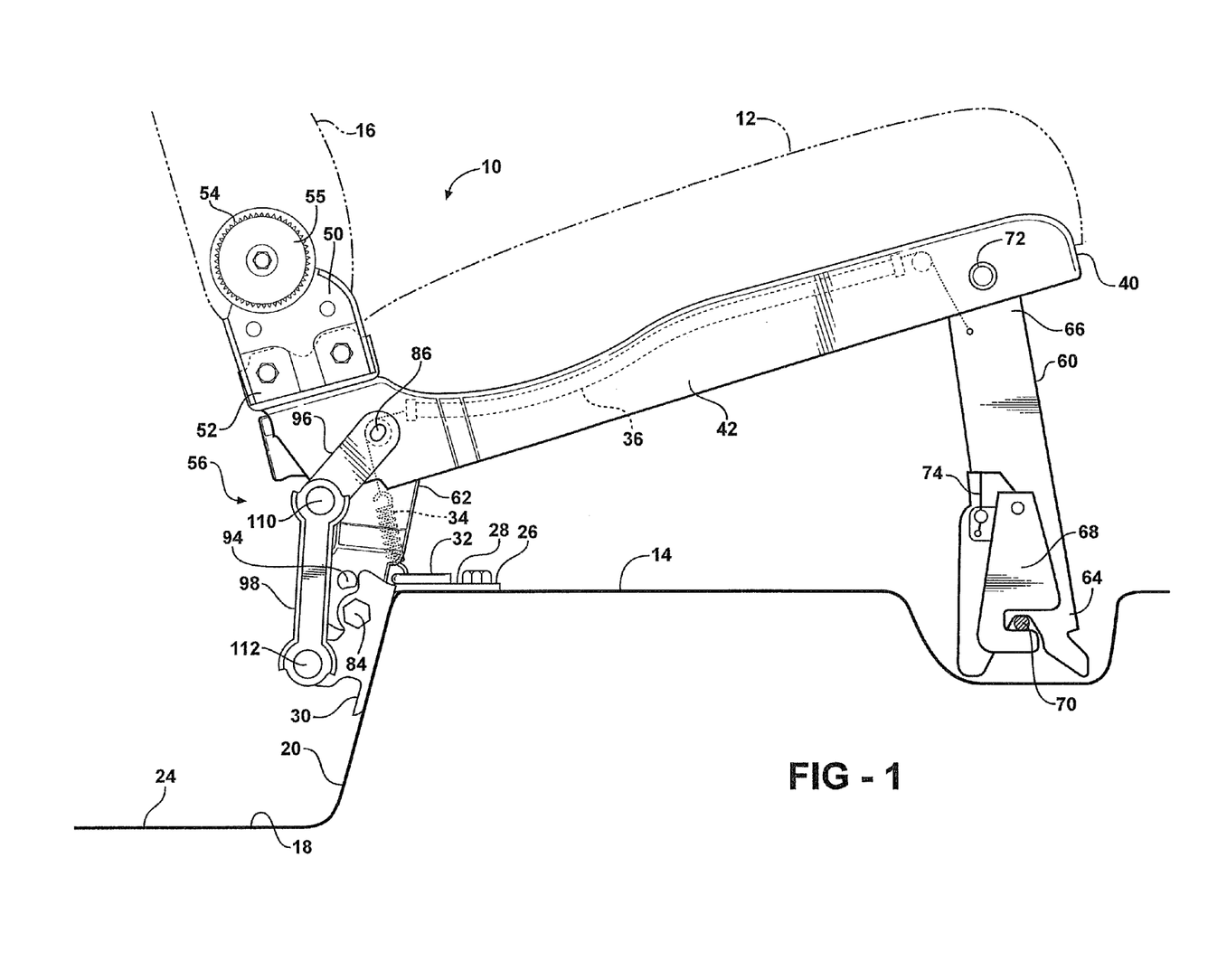
FIG. 1 is a fragmentary, side view of a seat assembly in a seating position including a power riser assembly according to the invention.

Referring to FIG. 1, a seat assembly for an automotive vehicle is generally shown at 10. The seat assembly 10 includes a seat cushion 12 for supporting an occupant above a floor 14, and a seat back 16 for supporting the back of the occupant. A recessed storage cavity 18 is formed in the floor 14 and is disposed generally rearward of the seat assembly 10. The recessed cavity 18 includes spaced apart generally vertical front 20 and rear 22 walls, shown in FIGS. 1 and 8, that are interconnected by a lower floor portion 24. A pair of mounting brackets 26 (one shown) each include a first portion 28 and a second portion 30. The first portion 28 is fixedly secured to the floor 14 by any suitable fixing means such as bolting, riveting, or welding. The second portion 30 extends into the recessed cavity 18 and is fixedly secured to the front wall 20 by any suitable fixing means such as bolting, riveting, or welding. A generally U-shaped rod 32 is fixedly secured to the first portion 28 of each of the mounting brackets 26 forming a loop, best seen in FIG. 8. The purpose of the loops 32 is set forth below.

Figure 7:
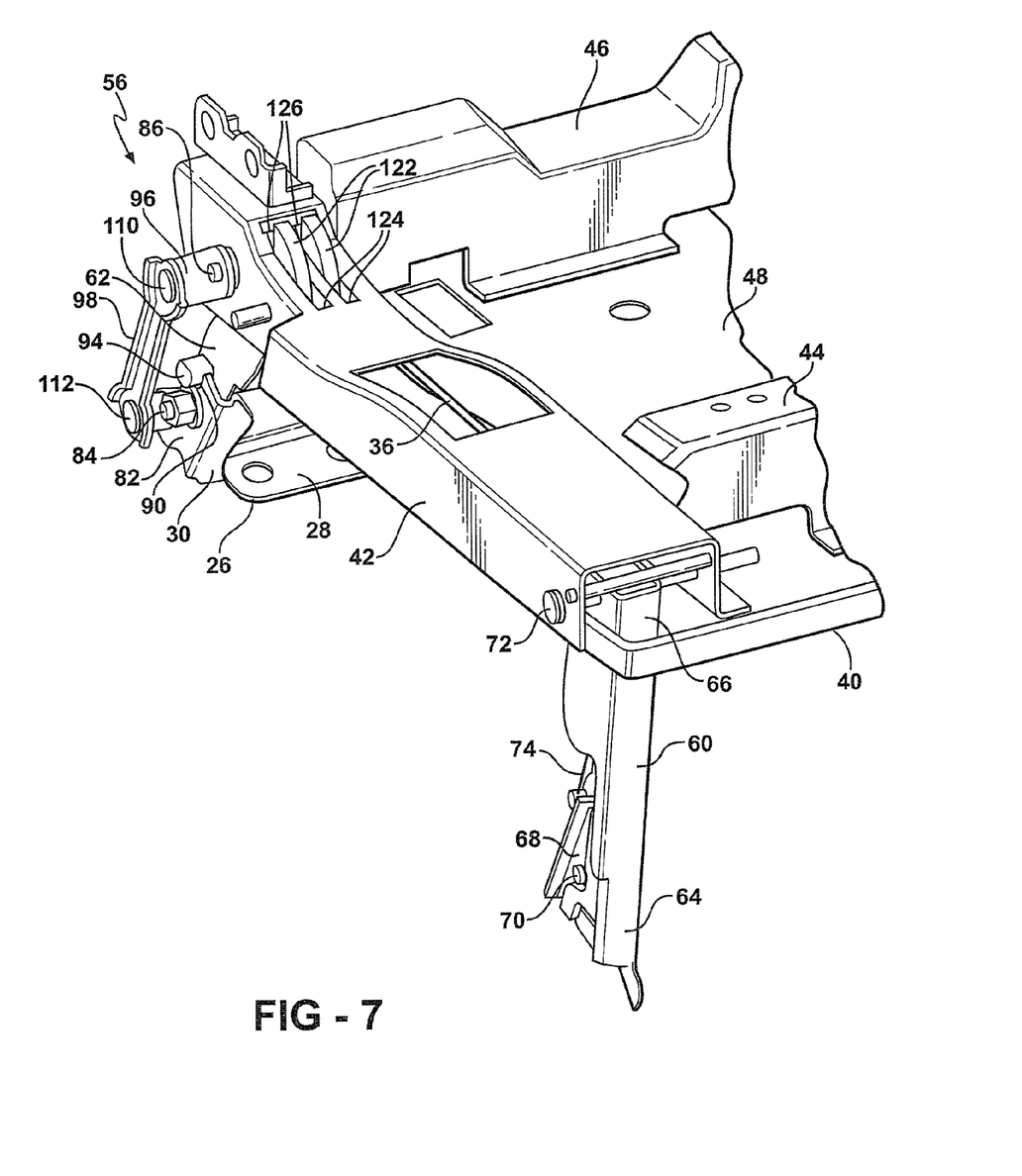
FIG. 7 is a fragmentary, top perspective view of the seat assembly in the seating position.

Referring to FIG. 7, the seat cushion 12 includes a seat cushion frame 40 for supporting a contoured foam pad encased by a trim cover, as is well known in the seating art. The seat cushion frame 40 includes a pair of generally parallel and spaced apart side members 42 (one shown) that are interconnected by front 44 and rear 46 cross-members. A generally planar stamped seat pan 48 is fixedly secured to each of the side members 42, the front cross-member 44, and the rear cross-member 46. The side members 42 have a downwardly-facing generally U-shaped cross-section.

Figure 2:
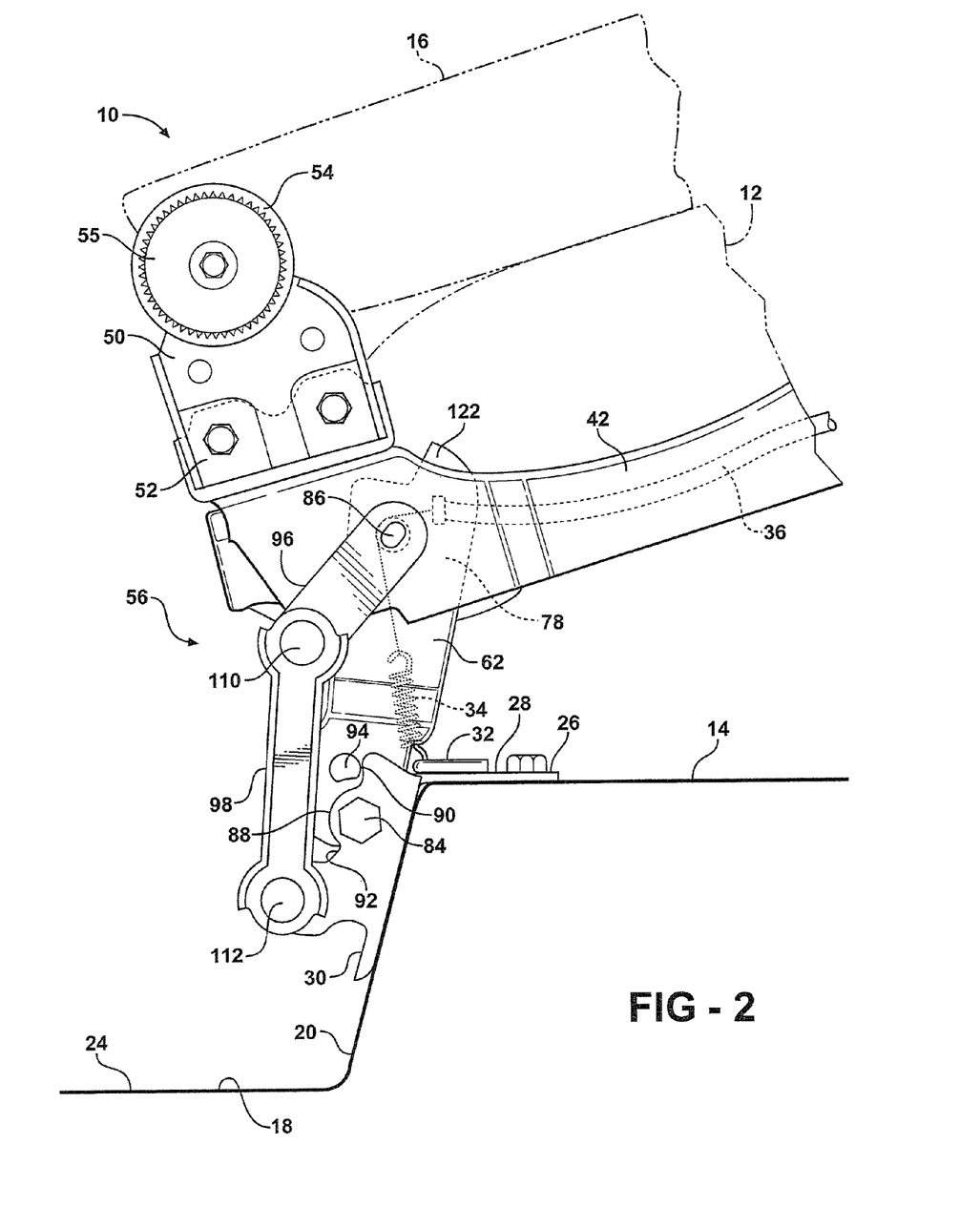
FIG. 2 is a fragmentary, side view of the seat assembly in the seating position with a seat back in a forwardly folded flat position.

Referring to FIG. 1, a pair of seat back brackets 50 (one shown) extend between a lower end 52 and an upper end 54. The lower end 52 of each seat back bracket 50 is fixedly secured to one of the side members 42 of the seat cushion frame 40. A power recliner mechanism 55 is operatively coupled between the upper end 54 of at least one of the seat back brackets 50 and the seat back 16 to provide selective pivotal adjustment of the seat back 16 relative to the seat cushion 12. Specifically, the seat back 16 is pivotable between a plurality of reclined seating positions, one of which is shown in FIG. 1. In addition, the seat back 16 is pivotable to a forwardly folded flat position overlying the seat cushion 12, shown in FIG. 2.

A riser assembly is generally shown at 56. The riser assembly 56 is operatively coupled between the seat cushion frame 40 and the floor 14 and is adapted for moving the seat assembly 10 between a seating position, shown in FIG. 1, and a stowed position disposed within the recessed cavity 18 formed in the floor 14, shown in FIG. 5. When the seat assembly 10 is in the stowed position an underside 58 of the seat cushion 12 faces upwardly and is flush with the floor 14 to provide a generally level load floor surface. The riser assembly 56 is also adapted for moving the seat assembly 10 between the seating position, shown in FIG. 1, and a rearward-facing seating position, shown in FIG. 8.

The riser assembly 56 includes a pair of laterally spaced apart front legs 60 (one shown) and a pair of laterally spaced apart rear legs 62 (one shown) positioned rearward of the front legs 60. Each of the front legs 60 extends between a lower end 64 and an upper end 66. The lower end 64 of each of the front legs 60 includes a latch mechanism 68, of any suitable type known in the art, that is adapted for releasably engaging a striker bar 70 that is fixedly secured to the floor 14. The upper end 66 of each of the front legs 60 is pivotally coupled to the seat cushion frame at pivot 72.

Figure 3:
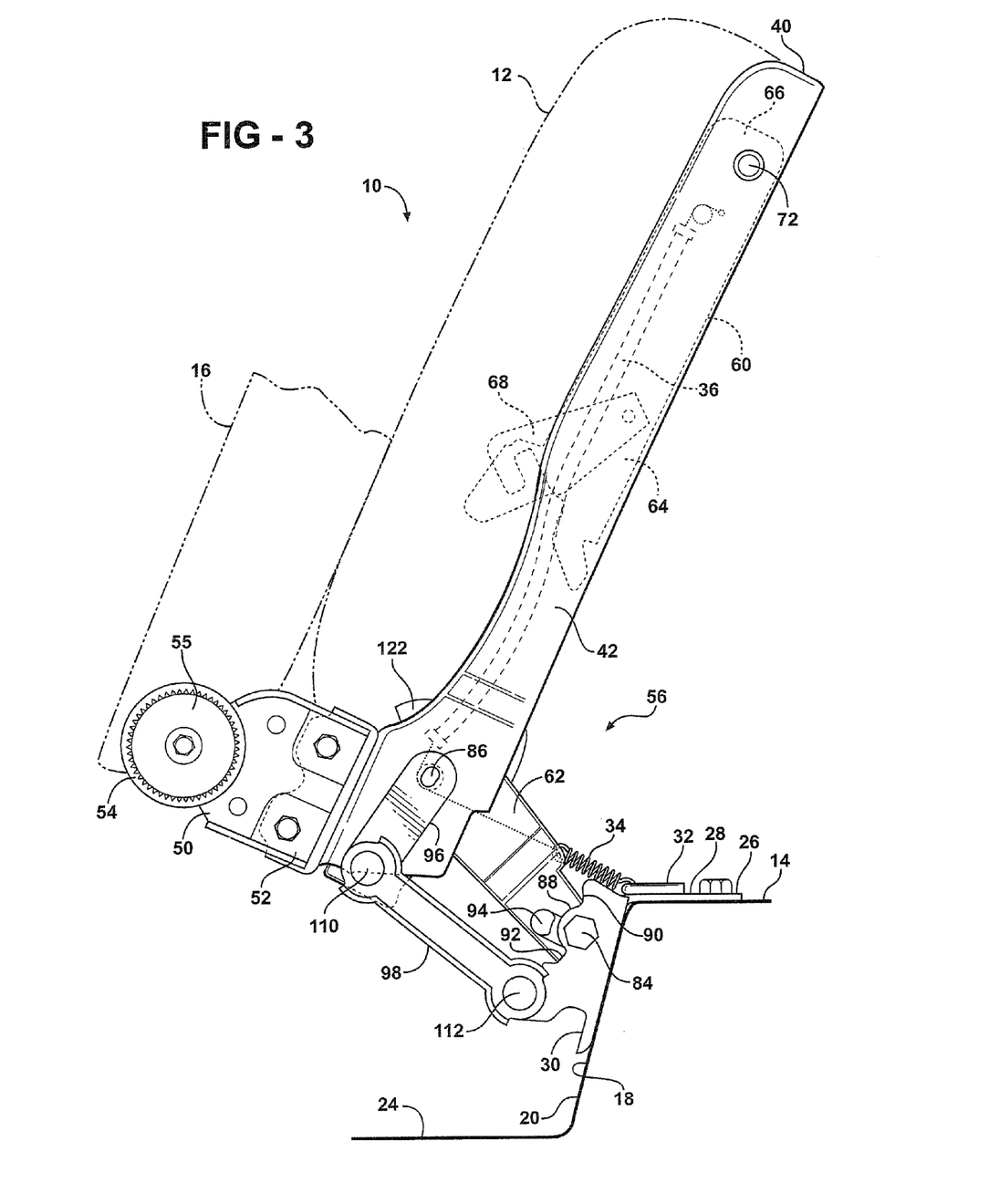
FIG. 3 is a fragmentary, side view of the seat assembly disposed between the seating position and a stowed position with a front leg in a retracted position.

The latch mechanism 68 is biased to a locked state such that when the seat assembly 10 is in the seating position, the lower end 64 of each of the front legs 60 is engaged with the corresponding striker bar 70. A second Bowden-type cable 74 extends between the latch mechanism 68 and a solenoid (not shown) mounted within the seat assembly 10. Operation of the solenoid pulls the second cable 74, which actuates the latch mechanism 68 to an unlocked state to disengage with the striker bar 70. When the latch mechanism 68 is disengaged with the striker bar 70 the front legs 60 are free to pivot about pivot 72. The front legs 60 pivot between an extended position generally perpendicular to the side members 42 of the seat cushion frame 40 when the seat assembly 10 is in the seating position, shown in FIG. 1, and a retracted position parallel with the side members 42, shown in FIG. 3, as the seat assembly 10 moves between the seating position and the stowed position. The pivotal movement of the front legs 60 between the extended and retracted positions is controlled by a pair of first Bowden-type cables 36 as the seat assembly 10 moves between the seating position and the stowed position. Each of the first cables 36 is operatively coupled between one of the front legs 60 and a tension spring 34, which in turn is coupled to one of the mounting brackets 26. More specifically, as the seat assembly 10 moves relative to the mounting brackets 26 from the seating position to the stowed position, the first cables 36 are effectively shortened, which causes the front legs 60 to pivot upwardly to the retracted position. Alternatively, as the seat assembly 10 moves from the stowed position to the seating position, the first cables 36 are effectively lengthened, which allows the front legs 60 to pivot downwardly to the extended position.

Figure 6:
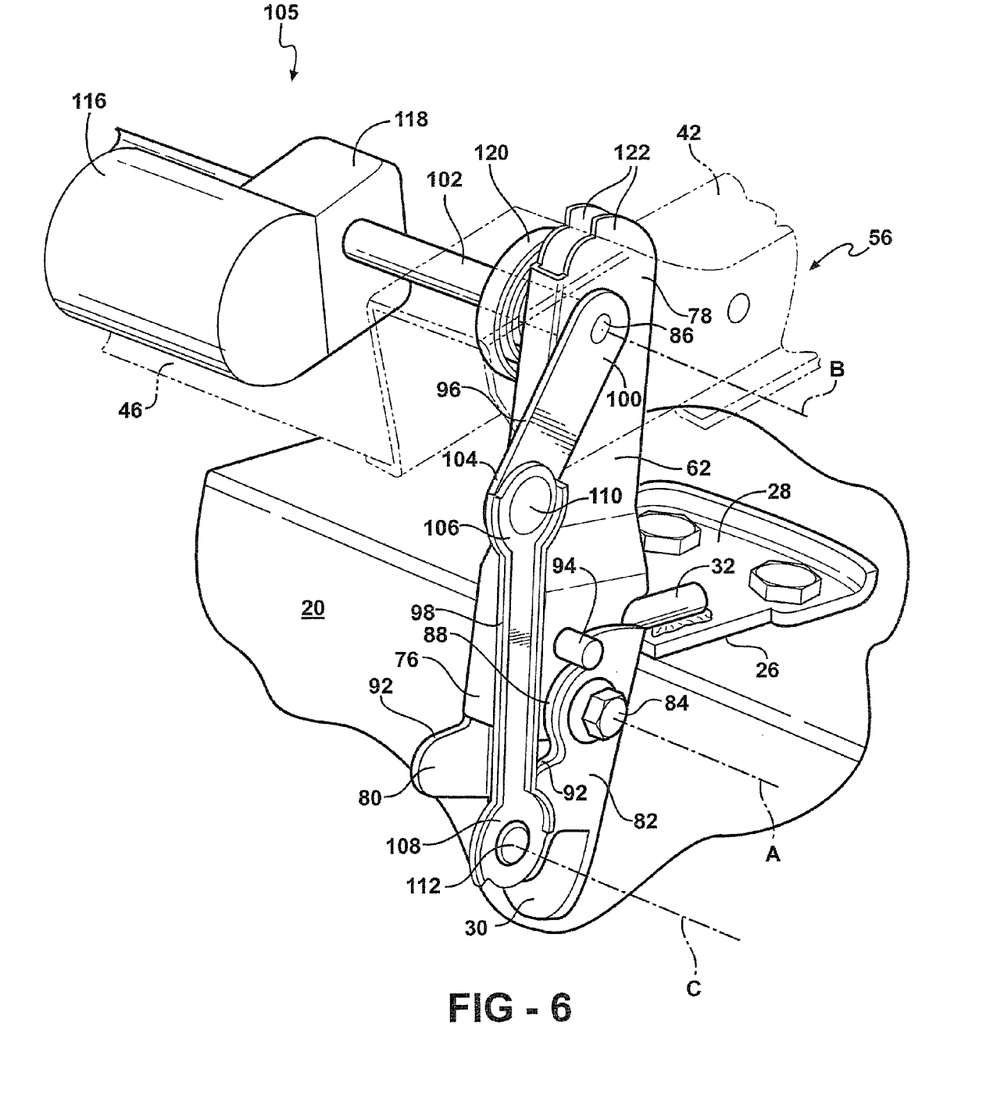
FIG. 6 is a fragmentary, rear perspective view of the seat assembly in the seating position.

Referring to FIG. 6, each of the rear legs 62 extend between a lower end 76 and an upper end 78. The second portion 30 of each of the mounting brackets 26 is adapted for receiving the lower end 76 of one of the rear legs 62 between an inner anchor portion 80 and an outer anchor portion 82. The lower end 76 of each of the rear legs 62 is pivotally coupled between the inner 80 and outer 82 anchor portions of the corresponding mounting bracket 26 by a pivot pin 84, defining a primary lower axis A. The upper end 78 of each of the rear legs 62 is pivotally coupled to one of the side members 42 of the seat cushion frame 40 at pivot 86, defining an upper axis B.

Figure 4:
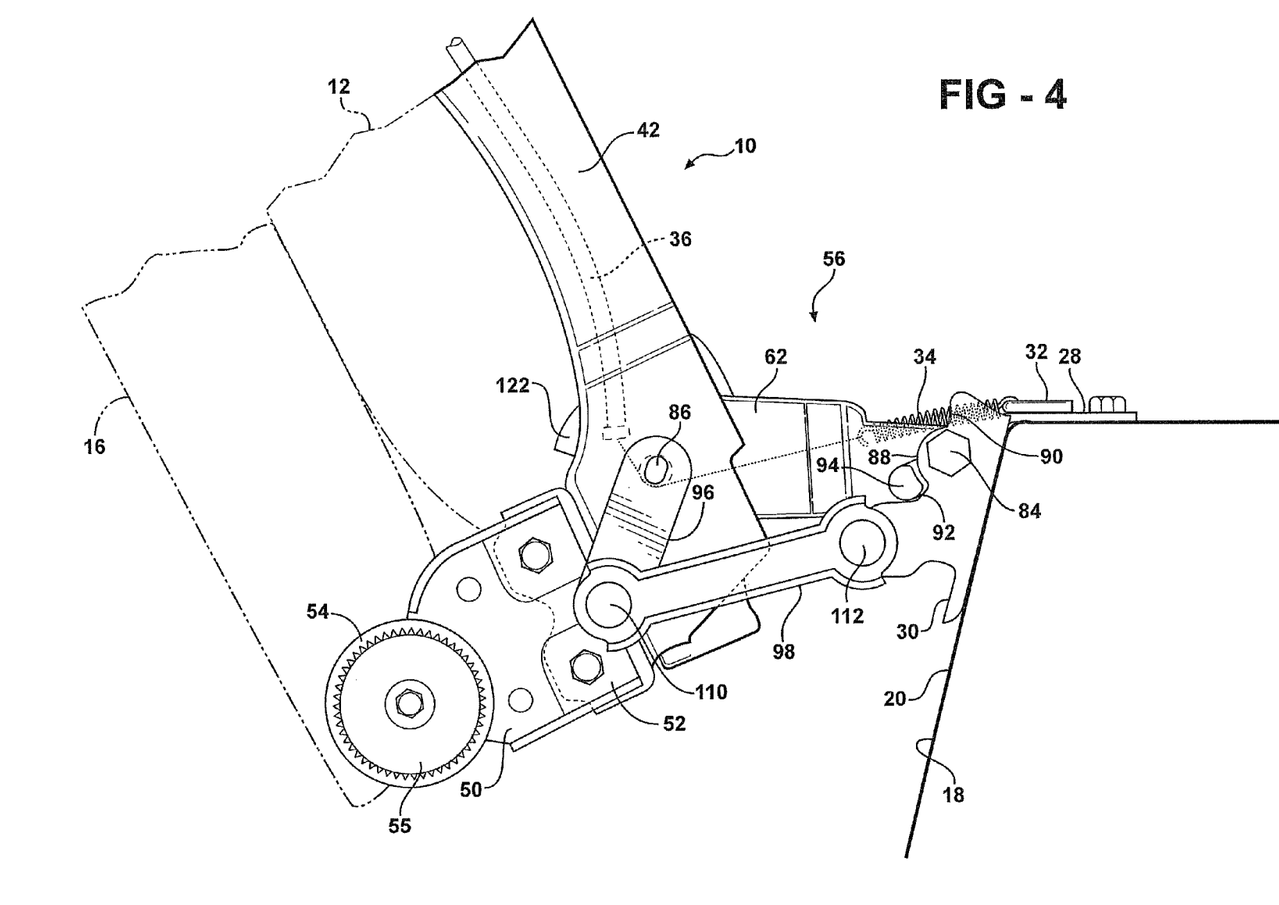
FIG. 4 is a fragmentary, side view of the seat assembly disposed in an intermediate position.

Each of the inner 80 and outer 82 anchor portions include a guide surface 88 extending between a seating end stop 90 and a stowed end stop 92. When the seat assembly 10 is in the seating position, a pair of stop pins 94 (one shown) protruding laterally outward from the lower end 76 of each of the rear legs 62 abuts the seating end stop 90 of the corresponding guide surface 88, as shown in FIG. 1. As the rear legs 62 pivot rewardly about the primary lower axis A, the stop pins 94 travel along the guide surfaces 88 toward the stowed end stop 92. Pivoting the rear legs 62 about the primary lower axis A causes the seat assembly 10 to pivot about the primary lower axis A. When the stop pins 94 reach the stowed end stop 92, the seat assembly 10 is in an intermediate position, as shown in FIG. 4, and further pivoting of the rear legs 62 about the primary lower axis A is prevented.

Referring again to FIG. 6, a pair of drive linkages (one shown) that is operatively coupled between the seat cushion frame 40 and each of the mounting brackets 26 is provided for transferring pivotal movement between the primary lower axis A and the upper axis B. In other words, the drive linkages transfer pivotal movement of the seat assembly 10 about the primary lower axis A to pivotal movement of the seat assembly 10 about the upper axis B, and vice versa. Pivotal movement of the seat assembly 10 about the primary lower axis A moves the seat assembly 10 between the seating position and the intermediate position. Pivotal movement of the seat assembly 10 about the upper axis B moves the seat assembly 10 between the intermediate position and the stowed position. Each drive linkage includes an upper link 96 and a lower link 98. The upper link 96 extends between a proximal end 100 fixedly secured to an output shaft 102 of a drive mechanism, generally shown at 105, and an opposite distal end 104. The lower link 98 extends between a first end 106 and a second end 108. The first end 106 of the lower link 98 is pivotally coupled by a first pin 110 to the distal end 104 of the upper link 96. The second end 108 of the lower link 98 is pivotally coupled by a second pin 112 to the outer anchor portion 82 of the corresponding mounting bracket 26, below the pivot pin 84 of the rear leg 62, defining a secondary lower axis C.

The drive mechanism 105 is operable for selectively rotating the output shaft 102 in a first direction and a second direction. In the embodiment shown, the drive mechanism 105 includes a reversible or bi-directional motor 116, a gear assembly 118 operatively coupled to the motor 116, and the output shaft 102 rotatably coupled to the gear assembly 118. The motor 116 and the gear assembly 118 are mounted to the seat cushion frame 40. The output shaft 102 extends coaxially along the upper axis B and passes through the side members 42 of the seat cushion frame 40 and the pivot 86 at the upper end 78 of each of the rear legs 62. Operation of the drive mechanism 105 to rotate the output shaft 102 in the first direction moves the seat assembly 10 from the seating position to the stowed position. Alternatively, operation of the drive mechanism 105 to rotate the output shaft 102 in the second direction moves the seat assembly 10 from the stowed position to the seating position.

A pair of torsion coil springs 120 (one shown) is provided to assist the drive mechanism 105. Each of the torsion springs 120 is disposed about one end of the output shaft 102 and is coupled between one of the rear legs 62 and the corresponding side member 42 of the seat cushion frame 40. In the current embodiment, the torsion springs 120 are set up to be relaxed or unloaded when the seat assembly 10 is in the intermediate position, shown in FIG. 4, and are wound or loaded when the seat assembly 10 is in the stowed position, shown in FIG. 5. Thus, the torsion springs 120 bias the seat assembly 10 from the stowed position toward the intermediate position. As such, the torsion springs 120 assist the drive mechanism 105 when the seat assembly 10 is moved from the stowed position to the intermediate position. Accordingly, the drive mechanism 105, and particularly the motor 116, can be of a reduced size which allows for quieter operation.

Referring to FIGS. 6 and 7, each of the rear legs 62 includes a pair of shark fins 122 integrally formed at the upper end 78 thereof. It is appreciated, however, that only one shark fin 122 is required. A pair of corresponding apertures 124 are formed in each side member 42 of the seat cushion frame 40 for receiving the shark fins 122 therein. Each aperture 124 defines a rearward surface 126. When the seat assembly 10 is in the seating position, the sharks fins 122 are disposed in the apertures 124 and are engaged with the corresponding rearward surfaces 126. When the seat assembly 10 is in the intermediate position, the shark fins 122 are also disposed in the apertures 124 and are engaged with the corresponding rearward surfaces 126. When the seat assembly 10 is in the stowed position, the shark fins 122 are withdrawn from the apertures 124 and are therefore disengaged with the rearward surfaces 126. As noted above, pivotal movement of the seat assembly 10 about the upper axis B moves the seat assembly 10 between the intermediate position and the stowed position. As the seat assembly 10 moves from the stowed position to the intermediate position, the shark fins 122 enter the apertures 124 and engage the rearward surfaces 126. Engagement of the shark fins 122 with the rearward surfaces prevents pivotal movement of the seat assembly 10 about the upper axis B and thereby transfers pivotal movement of the seat assembly 10 from about the upper axis B to about the primary lower axis A.

Figure 5:
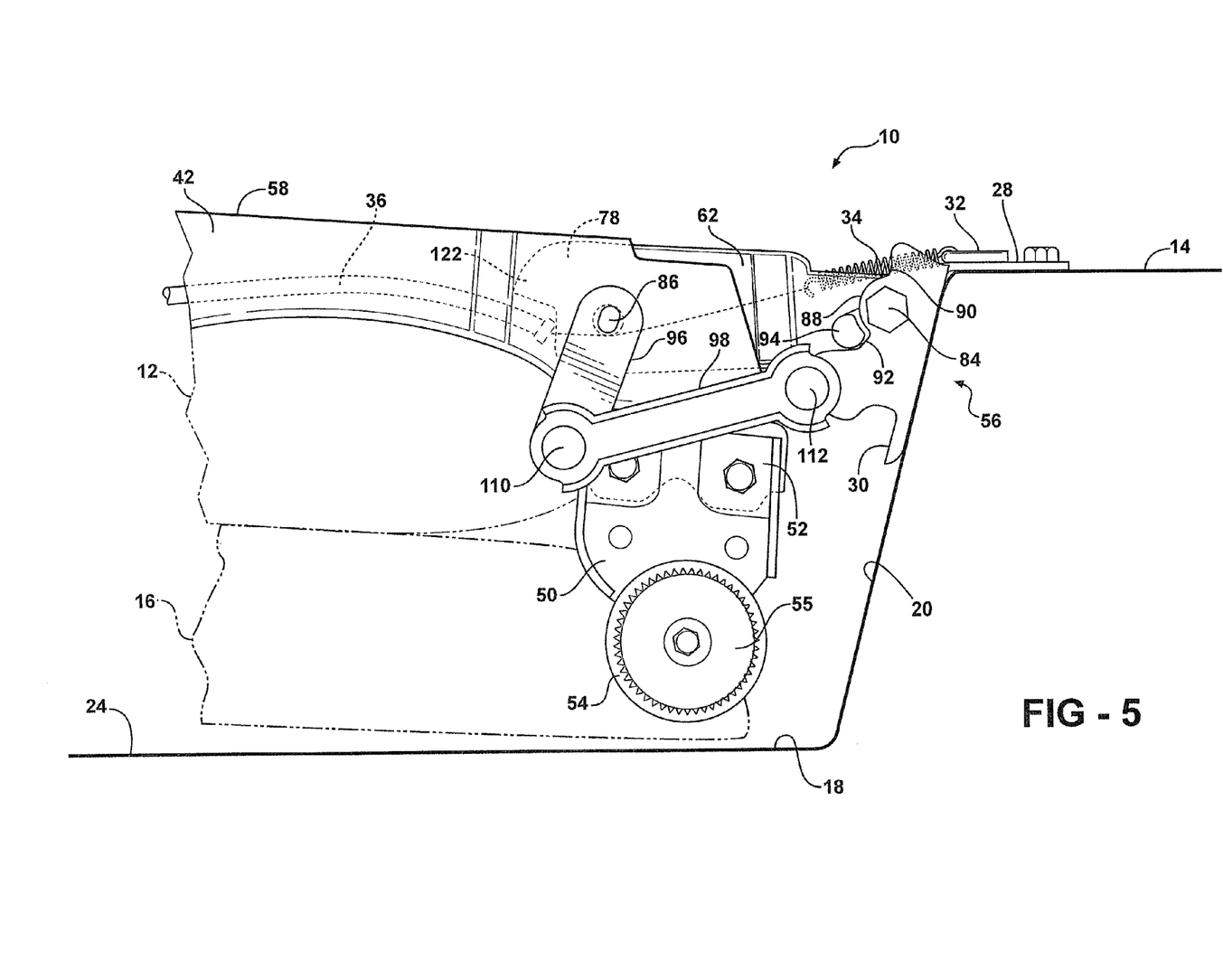
FIG. 5 is a fragmentary, side view of the seat assembly disposed in the stowed position.

In operation, the seat assembly 10 can be moved from the seating position, shown in FIG. 1, to the stowed position, shown in FIG. 5, by pressing a first button (not shown) for example. Pressing the first button actuates the power recliner mechanism 55 to move the seat back 16 from one of the plurality of reclined seating positions to the forwardly folded flat position, shown in FIG. 2. The solenoid then actuates to pull the second cable 74, which actuates the latch mechanism 68 to the unlocked state to disengage with the striker bar 70. Next, the drive mechanism 105 rotates the output shaft 102 in the first or clockwise direction (when viewed from the Figures). Rotation of the output shaft 102 in the clockwise direction causes the upper link 96 to pivot about the upper axis B in the clockwise direction since the proximal end 100 of the upper link 96 is fixedly secured to the output shaft 102. Pivotal movement of the upper link 96 in the clockwise direction causes the lower link 98 to pivot about the secondary lower axis C in the second or counterclockwise direction (when viewed from the Figures) because movement of the second end 108 of the lower link 98 is restrained in two directions by the second pin 112. Pivotal movement of the lower link 98 in the counterclockwise direction pulls the upper link 96, the output shaft 102, and the seat assembly 10 rearwardly, which causes the rear leg 62 to pivot about the primary lower axis A in the counterclockwise direction. As the rear leg 62 pivots in the counterclockwise direction, thereby moving relative to the mounting bracket 26, the first cable 36 is effectively shortened, which causes the front leg 60 to pivot upwardly to the retracted position. The rear leg 62 pivots about the primary lower axis A until the stop pins 94 abut the stowed end stop 92 of the corresponding guide surfaces 88, which prevents further pivoting of the rear leg 62 in the counterclockwise direction. Once the rear leg 62 is prevented from pivoting in the counterclockwise direction, the lower link 98 is also prevented from pivoting in the counterclockwise direction. The seat assembly 10 is now in the intermediate position, shown in FIG. 4.

With the rear leg 62 and the lower link 98 prevented from pivoting in the counterclockwise direction continued operation of the drive mechanism 105 to rotate the output shaft 102 in the clockwise direction urges the drive linkage to transfer the pivotal movement of the seat assembly 10 about the primary lower axis A to pivotal movement of the seat assembly 10 about the upper axis B. Thus, the seat assembly 10 pivots about the upper axis B in the counterclockwise direction until the seat assembly 10 is disposed in the recessed cavity 18 in the floor 14, as shown in FIG. 5. The seat assembly 10 is now in the stowed position.

The seat assembly 10 can be returned from the stowed position to the seating position by pressing a second button (not shown) for example. Pressing the second button actuates the drive mechanism 105 to rotate the output shaft 102 in the counterclockwise direction. Rotation of the output shaft 102 in the counterclockwise direction causes the seat assembly 10 to pivot about the upper axis B in the clockwise direction. As the seat assembly 10 pivots toward the intermediate position, the shark fins 122 enter the apertures 124. When the seat assembly 10 reaches the intermediate position the shark fins 122 engage the rearward surfaces 126 of the apertures 124, which prevents further pivotal movement of the seat assembly 10 about the upper axis B in the clockwise direction.

The drive mechanism 105 continues to rotate the output shaft 102 in the counterclockwise direction until the seat assembly 10 is in the seating position. Because the seat assembly 10 is prevented from pivoting about the upper axis B, the drive linkage transfers the pivotal movement of the seat assembly 10 about the upper axis B to pivotal movement of the seat assembly 10 about the primary lower axis A. Rotation of the output shaft 102 in the counterclockwise direction causes the upper link 96 to pivot about the upper axis B in the counterclockwise direction since the proximal end 100 of the upper link 96 is fixedly secured to the output shaft 102. Pivotal movement of the upper link 96 in the counterclockwise direction causes the lower link 98 to pivot about the secondary lower axis C in the clockwise direction because movement of the second end 108 of the lower link 98 is restrained in two directions by the second pin 112. Pivotal movement of the lower link 98 in the clockwise direction pulls the upper link 96, the output shaft 102, and the seat assembly 10 forwardly, which causes the rear leg 62 to pivot about the primary lower axis A in the clockwise direction. As the rear leg 62 pivots in the clockwise direction the first cable 36 is effectively lengthened, which causes the front leg 60 to pivot downwardly to the extended position. The rear leg 62 pivots in the clockwise direction until the stop pins 94 abut the seating end stop 90 of the corresponding guide surfaces 88, which prevents further pivoting of the rear leg 62 in the clockwise direction. At the same time, the latch mechanism 68 engages the corresponding striker bar 70. Finally, the power recliner mechanism 55 actuates to move the seat back 16 from the forwardly folded flat position to the previous reclined seating position. The seat assembly 10 is now in the seating position.

Figure 8:
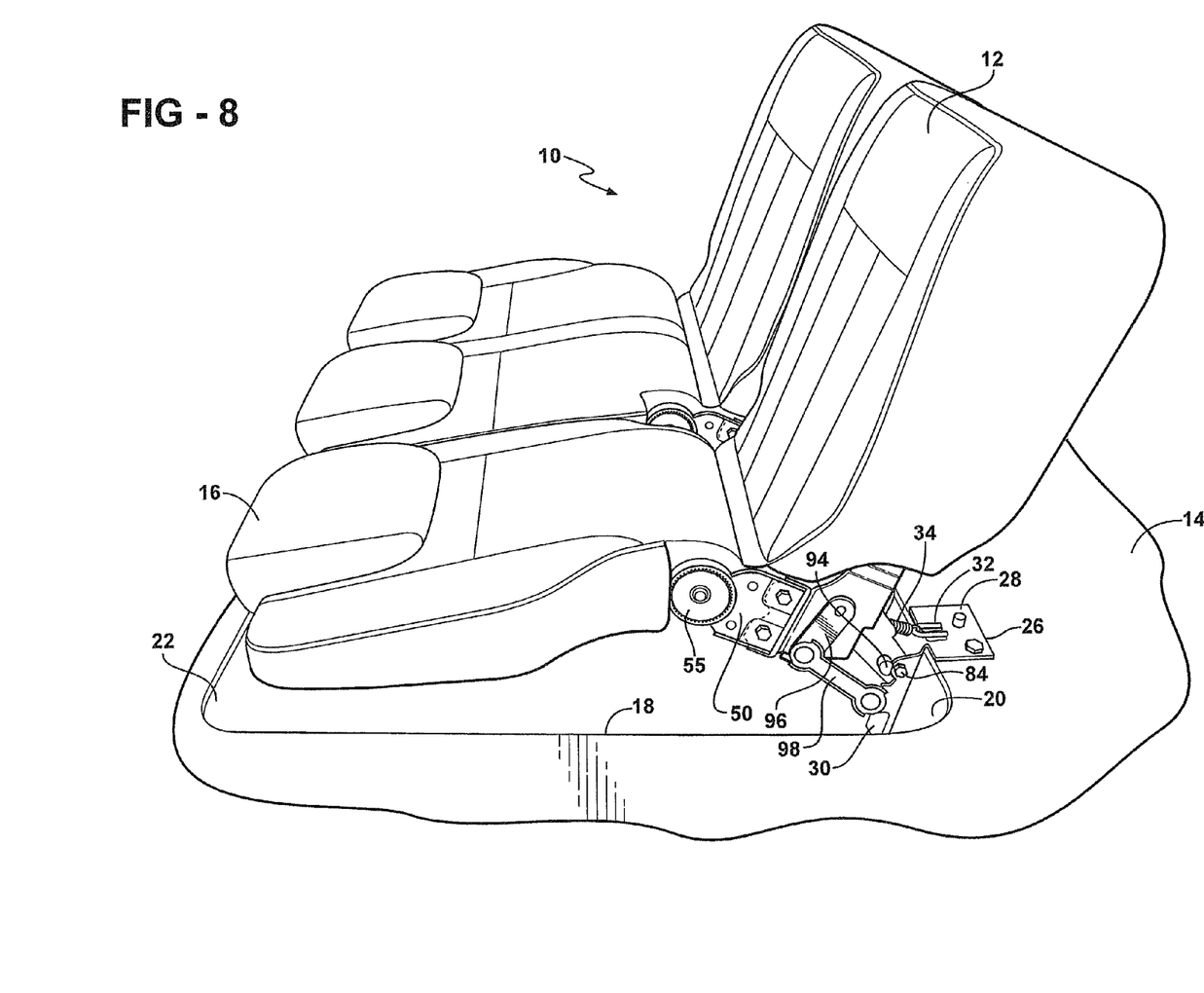
FIG. 8 is a side perspective view of the seat assembly in a rearward-facing seating position.

Alternatively, the seat assembly 10 can be moved between the seating position, as shown in FIG. 1, and the rearward-facing seating position, shown in FIG. 8, by pressing a third button (not shown) for example. Pressing the third button actuates the power recliner mechanism 55 to move the seat back 16 from one of the plurality of reclined seating positions to a predetermined generally upright position. The solenoid then actuates to pull the second cable 74, which actuates the latch mechanism 68 to the unlocked state to disengage with the striker bar 70. Next, the drive mechanism 105 rotates the output shaft 102 in the clockwise direction (when viewed from FIG. 6). Rotation of the output shaft 102 in the clockwise direction causes the upper link 96 to pivot about the upper axis B in the clockwise direction since the proximal end 100 of the upper link 96 is fixedly secured to the output shaft 102. Pivotal movement of the upper link 96 in the clockwise direction causes the lower link 98 to pivot about the secondary lower axis C in the counterclockwise direction (when viewed from FIG. 6) because movement of the second end 108 of the lower link 98 is restrained in two directions by the second pin 112. Pivotal movement of the lower link 98 in the counterclockwise direction pulls the upper link 96, the output shaft 102, and the seat assembly 10 rearwardly, which causes the rear leg 62 to pivot about the primary lower axis A in the counterclockwise direction. As the rear leg 62 pivots in the counterclockwise direction, thereby moving relative to the mounting bracket 26, the first cable 36 is effectively shortened, which causes the front leg 60 to pivot upwardly to the retracted position. The rear leg 62 pivots about the primary lower axis A until the seat back 16 abuts the floor 14 at the rear wall 22 of the recessed cavity 18. The seat assembly 10 is now in the rearward-facing seating position, as shown in FIG. 8.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A power riser assembly operatively coupled between a seat assembly and a floor of an automotive vehicle for moving the seat assembly between a seating position spaced above the floor and a stowed position disposed within a recessed cavity in the floor, said power riser assembly comprising:
    an anchor adapted to be fixedly secured to the floor, said anchor having opposite seating and stowed end stops;
    a rear leg extending between an upper end pivotally coupled to the seat assembly defining an upper axis and a lower end pivotally coupled to said anchor defining a lower axis, said rear leg adapted for engaging said seating and stowed end stops, and said rear leg adapted for engaging the seat assembly as said rear leg travels between said seating and stowed end stops, said rear leg including a shark fin extending from said upper end thereof and said seat assembly having an aperture defining a rearward surface wherein said shark fin engages said rearward surface of said aperture to prevent pivotal movement of said seat assembly about said upper axis;
    a drive mechanism mounted to the seat assembly;
    a drive linkage operatively coupled between said drive mechanism and said anchor, said drive linkage operable for pivoting the seat assembly about said lower axis and said upper axis and for transferring pivotal movement of the seat assembly between said lower axis and said upper axis;
    wherein said drive linkage pivots the seat assembly about said lower axis in response to operation of said drive mechanism in a first direction such that said rear leg travels from said seating end stop to said stowed end stop, and said drive linkage transfers pivotal movement of the seat assembly to said upper axis in response to continued operation of said drive mechanism in said first direction when said rear leg engages said stowed end stop thereby moving the seat assembly to the stowed position, and wherein said drive linkage pivots the seat assembly about said upper axis in response to operation of said drive mechanism in a second direction, and said drive linkage transfers pivotal movement of the seat assembly to said lower axis in response to continued operation of said drive mechanism in said second direction when said rear leg engages the seat assembly such that said rear leg travels from said stowed end stop to said seating end stop thereby moving the seat assembly to the seating position.

2. A power riser assembly as set forth in claim 1 wherein said rear leg includes a stop pin projecting laterally from said lower end thereof, said stop pin adapted for engaging said seating and stowed end stops of said anchor.

3. A power riser assembly as set forth in claim 2 further including a front leg extending between an upper end pivotally coupled to the seat assembly and a lower end adapted to be releasably secured to the floor.

4. A power riser assembly as set forth in claim 3 wherein said front leg is pivotally movable between an extended position for supporting the seat assembly in the seating position and a retracted position in response to pivoting the seat assembly about said lower axis.

5. A power riser assembly as set forth in claim 4 including a first cable operatively coupled between said front leg and said anchor for actuating said front leg between said extended and retracted positions.

6. A power riser assembly as set forth in claim 5 wherein said drive mechanism includes an output shaft extending coaxially with said upper axis, said output shaft rotatable in said first and second directions and said drive linkage fixedly secured to said output shaft for actuation thereof.

7. A power riser assembly as set forth in claim 6 wherein said drive linkage includes an upper link and a lower link, said upper link extending between a proximal end fixedly secured to said output shaft and a distal end, said lower link extending between a first end pivotally coupled to said distal end of said upper link and a second end pivotally coupled to said anchor.

8. A power riser assembly as set forth in claim 7 wherein operation of said drive mechanism in said first direction rotates said output shaft in said first direction, thereby pivoting said upper link in said first direction when said shark fin is engaged with the seat assembly and causing said lower link to pivot in said second direction, and wherein operation of said drive mechanism in said second direction rotates said output shaft in said second direction, thereby pivoting said upper link in said second direction when said shark fin is engaged with the seat assembly and causing said lower link to pivot in said first direction.

9. A power riser assembly as set forth in claim 8 wherein said shark fin is engaged with said rearward surface of said aperture when the seat assembly pivots about said lower axis.

10. A power riser assembly as set forth in claim 9 wherein said shark fin is disengaged with said rearward surface of said aperture and said stop pin is engaged with said stowed end stop of said anchor when the seat assembly pivots about said upper axis.

11. A power riser assembly operatively coupled between a seat assembly and a vehicle floor, the floor having seating and stowed end stops for moving the seat assembly between a seating position spaced above the floor, an intermediate position, and a stowed position disposed within a recessed cavity in the floor, said power riser assembly comprising:
  a rear leg extending between a lower end and an upper end, said lower end adapted to be pivotally coupled to the floor defining a lower axis, said upper end pivotally coupled to the seat assembly defining an upper axis, said rear leg adapted for engaging the seating end stop, the stowed end stop, and the seat assembly, said rear leg including a shark fin extending from said upper end thereof and said seat assembly having an aperture defining a rearward surface wherein said shark fin engages said rearward surface of said aperture to prevent pivotal movement of said seat assembly about said upper axis;
  a drive mechanism mounted to the seat assembly;
  a drive linkage operatively coupled between said drive mechanism and the floor, wherein said drive mechanism actuates in a first direction causing said drive linkage to pivot the seat assembly about said lower axis from the seating position, defined when said lower end of said rear leg engages the seating end stop, to the intermediate position, defined when said lower end of said rear leg engages the stowed end stop, whereat said drive linkage transfers pivotal movement of the seat assembly to said upper axis thereby moving the seat assembly to the stowed position, and wherein said drive mechanism actuates in a second direction causing said drive linkage to pivot the seat assembly about said upper axis from the stowed position to the intermediate position, defined when said upper end of said rear leg engages the seat assembly, whereat said drive linkage transfers pivotal movement of the seat assembly to said lower axis thereby moving the seat assembly to the seating position.

12. A seat assembly for supporting an occupant in an automotive vehicle having a floor with a recessed cavity, said seat assembly comprising:
  a seat cushion;
  a seat back operatively coupled to said seat cushion for pivotal movement between a generally upright position and a forwardly folded flat position overlying said seat cushion;
  an anchor adapted to be fixedly secured to the floor, said anchor having opposite seating and stowed end stops;
  a rear leg extending between a lower end pivotally coupled to said anchor defining a lower axis and an upper end pivotally coupled to said seat assembly defining an upper axis, said rear leg adapted for engaging said seating and stowed end stops, and said rear leg adapted for engaging said seat cushion as said rear leg travels between said seating and stowed end stops, said rear leg including a shark fin extending from said upper end thereof and said seat cushion having an aperture defining a rearward surface wherein said shark fin engages said rearward surface of said aperture to prevent pivotal movement of said seat assembly about said upper axis;
  a drive mechanism mounted to said seat assembly;
  a drive linkage operatively coupled between said drive mechanism and said anchor, said drive linkage operable for pivoting said seat assembly about said lower axis and said upper axis and for transferring pivotal movement of said seat assembly between said lower axis and said upper axis;
  wherein said drive linkage pivots said seat assembly about said lower axis in response to operation of said drive mechanism in a first direction such that said rear leg travels from said seating end stop to said stowed end stop, and said drive linkage transfers pivotal movement of said seat assembly to said upper axis in response to continued operation of said drive mechanism in said first direction when said rear leg engages said stowed end stop thereby moving said seat assembly to a stowed position disposed within the recessed cavity, and wherein said drive linkage pivots said seat assembly about said upper axis in response to operation of said drive mechanism in a second direction, and said drive linkage transfers pivotal movement of said seat assembly to said lower axis in response to continued operation of said drive mechanism in said second direction when said rear leg engages said seat cushion such that said rear leg travels from said stowed end stop to said seating end stop thereby moving said seat assembly to a seating position spaced above the floor.

13. A seat assembly as set forth in claim 12 wherein said rear leg includes a stop pin projecting laterally from said lower end thereof, said stop pin adapted for engaging said seating and stowed end stops of said anchor.

14. A seat assembly as set forth in claim 13 wherein said shark fin is adapted for engaging said seat cushion when said seat assembly pivots about said lower axis.

15. A seat assembly as set forth in claim 14 wherein said seat assembly pivots about said lower axis between said seating position whereat said stop pin engages said seating end stop of said anchor and an intermediate position whereat said stop pin engages said stowed end stop of said anchor.

16. A seat assembly as set forth in claim 15 wherein said seat assembly pivots about said upper axis between said intermediate position whereat said stop pin engages said stowed end stop of said anchor and said stowed position whereat said stop pin engages said stowed end stop of said anchor.

17. A seat assembly as set forth in claim 16 further including a torsion spring coupled between said seat assembly and said rear leg, wherein said torsion spring is adapted for biasing said seat assembly about said upper axis toward said intermediate position.

* * * * *